United States Patent

Kang

(10) Patent No.: US 8,797,445 B2
(45) Date of Patent: Aug. 5, 2014

(54) DIGITAL PHOTOGRAPHING DEVICE AND METHOD OF CONTROLLING THE SAME

(75) Inventor: Tae-hoon Kang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 450 days.

(21) Appl. No.: 13/022,782

(22) Filed: Feb. 8, 2011

(65) Prior Publication Data

US 2011/0221911 A1 Sep. 15, 2011

(30) Foreign Application Priority Data

Mar. 11, 2010 (KR) .................... 10-2010-0021843

(51) Int. Cl.
*G02B 13/16* (2006.01)
*H04N 5/225* (2006.01)

(52) U.S. Cl.
USPC ........... 348/335; 348/340; 348/345; 348/348; 348/349

(58) Field of Classification Search
USPC ............... 348/335, 340, 345, 348, 349, 363, 348/208.16, 352
See application file for complete search history.

(56) References Cited

U.S. PATENT DOCUMENTS

| 2006/0176388 | A1* | 8/2006 | Kinjo | 348/333.01 |
|---|---|---|---|---|
| 2007/0274703 | A1* | 11/2007 | Matsuda | 396/264 |
| 2009/0079844 | A1* | 3/2009 | Suzuki | 348/222.1 |
| 2010/0013945 | A1* | 1/2010 | Hada | 348/222.1 |

FOREIGN PATENT DOCUMENTS

| JP | 2004-336265 A | 11/2004 |
|---|---|---|
| JP | 2008-256878 A | 10/2008 |

* cited by examiner

*Primary Examiner* — Yogesh Aggarwal

(74) *Attorney, Agent, or Firm* — Drinker Biddle & Reath LLP

(57) ABSTRACT

A digital photographing device includes an input unit that receives face information, an image generating unit that generates an image having at least one face, a face detecting unit that detects faces from the image, a determination unit that determines whether the detected faces correspond to the received face information, and an output signal generating unit that generates an output signal when the detected faces correspond to the received face information based on a determination result of the determination unit. A method of controlling a digital photographing device includes: receiving face information, generating an image having at least one face, detecting the faces from the image, determining whether the detected faces correspond to the received face information, and generating an output signal when the detected faces correspond to the received face information based on a determination result.

18 Claims, 8 Drawing Sheets

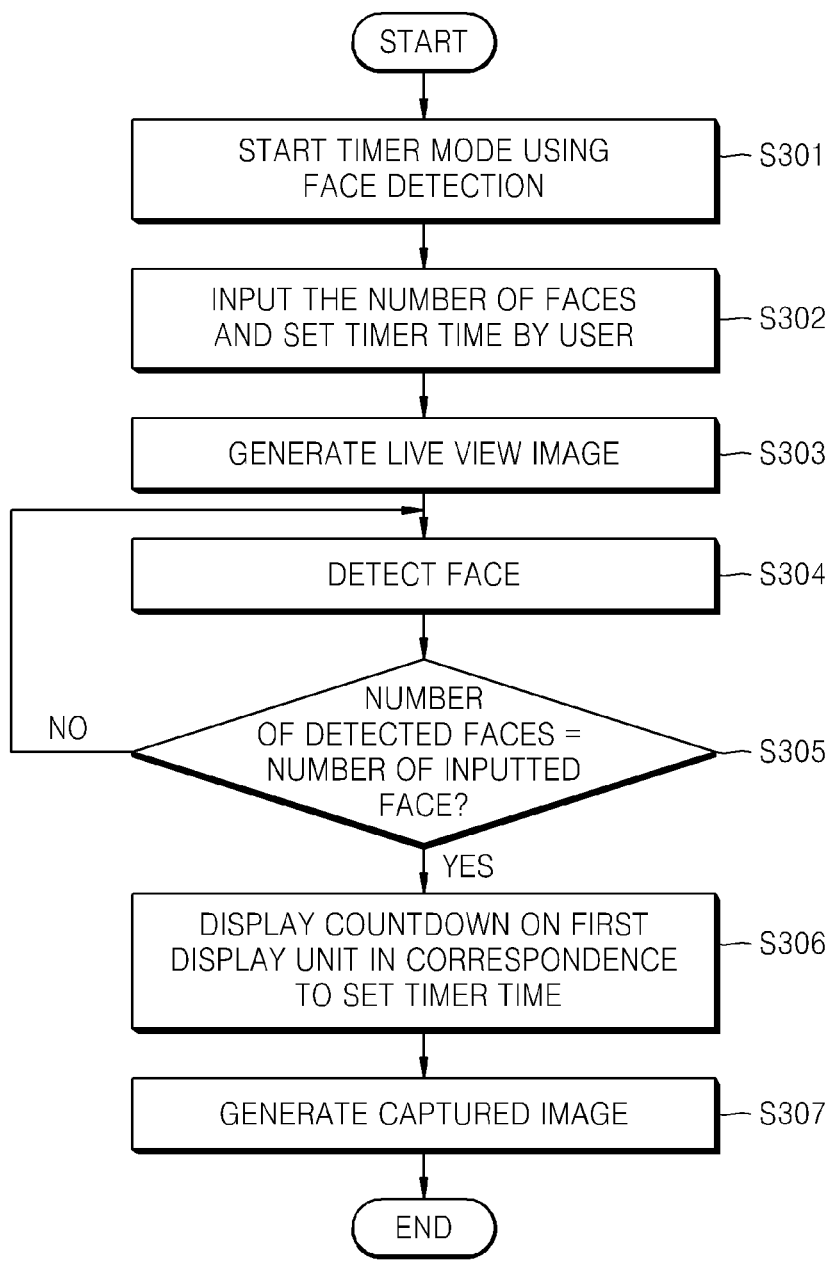

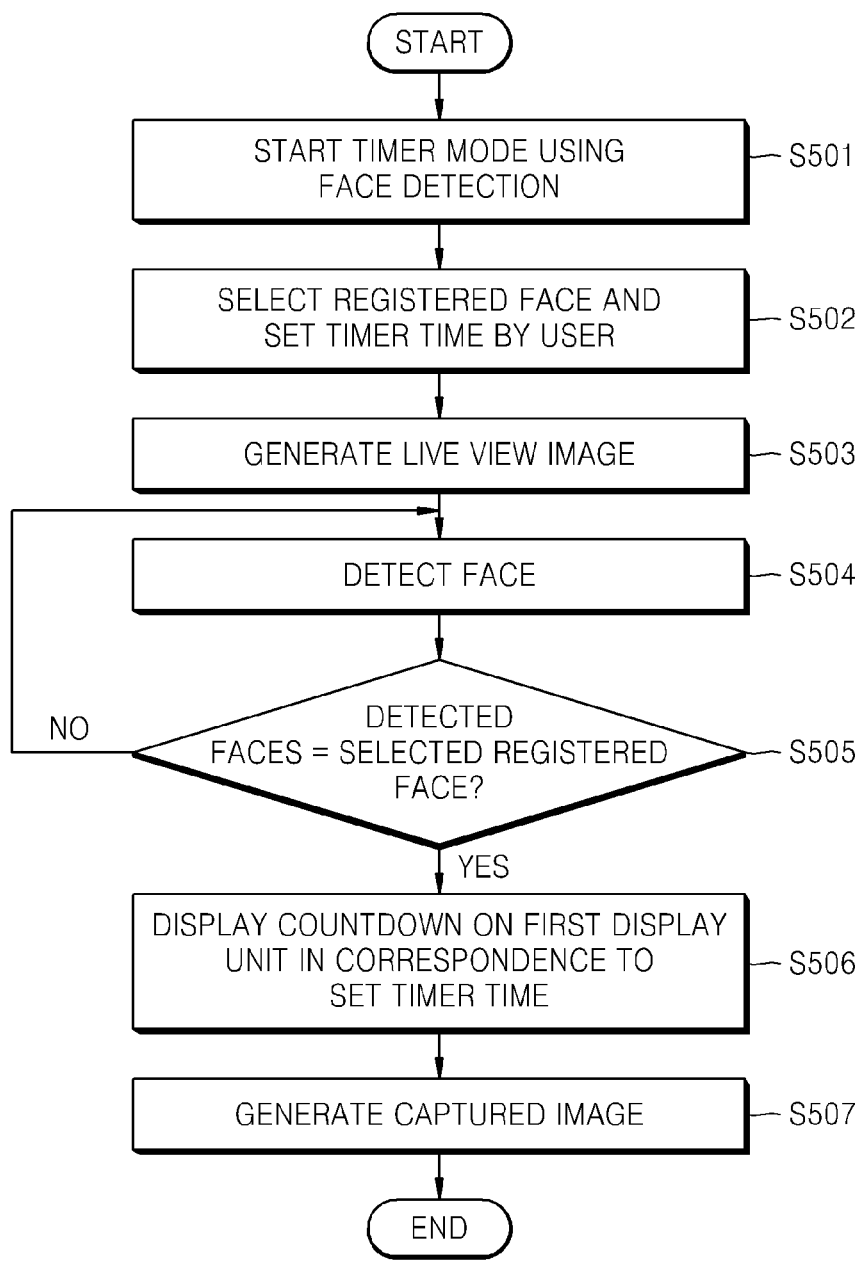

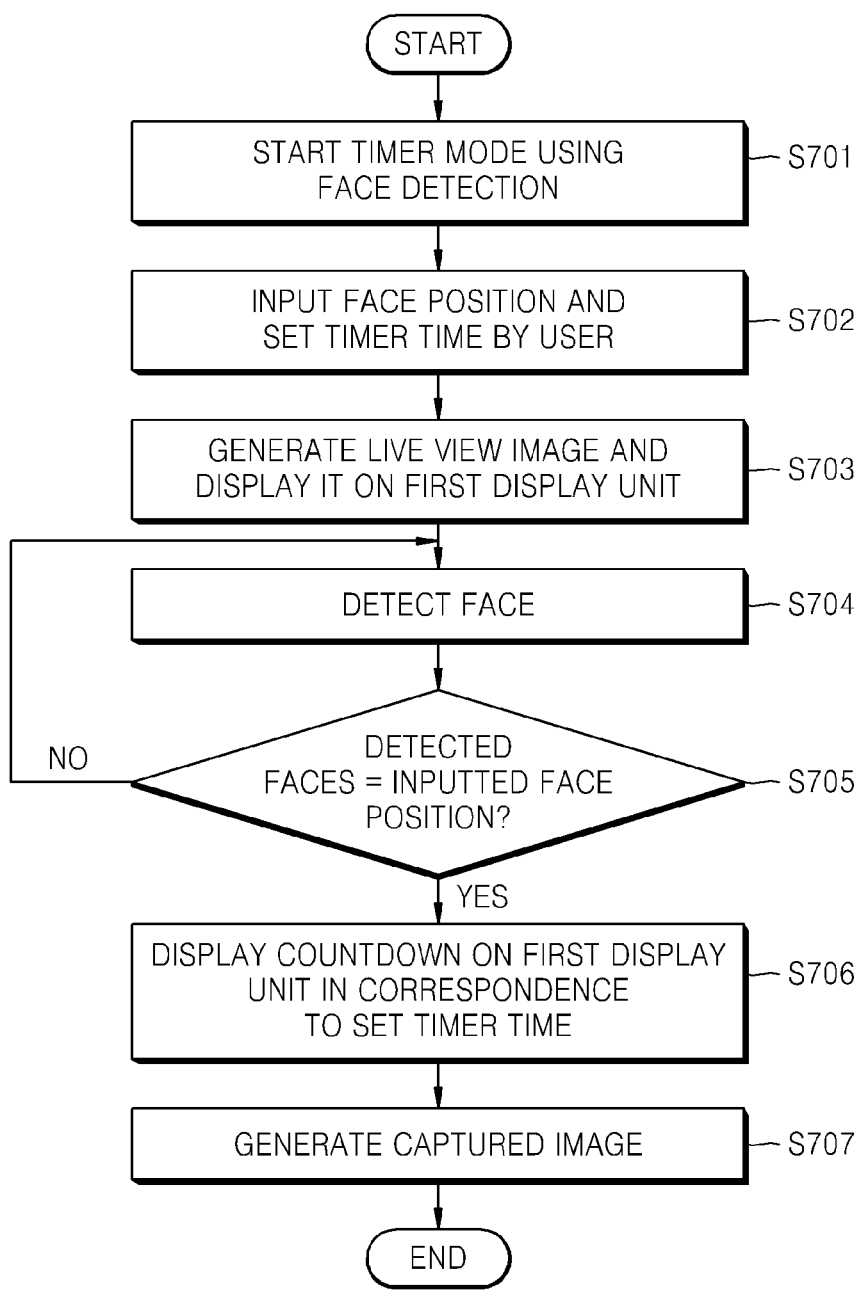

DIGITAL PHOTOGRAPHING DEVICE AND METHOD OF CONTROLLING THE SAME

CROSS-REFERENCE TO RELATED PATENT APPLICATION

This application claims the priority benefit of Korean Patent Application No. 10-2010-0021843, filed on Mar. 11, 2010, in the Korean Intellectual Property Office, the entire disclosure of which is incorporated herein by reference.

BACKGROUND

1. Field of the Invention

Embodiments relate to a digital photographing device and a method of controlling the same.

2. Description of the Related Art

In order to include a photographer as a subject when taking a picture, the picture may be remotely taken with a remote control or a timer function. However, the remote control needs to be carried, and if the remote control is outside of an operable range, it becomes useless. Moreover, if the timer function is used, a picture is automatically taken when a time set on the timer expires, regardless of whether the photographer is able to pose for the picture. In other words, the photographer may be required to be agile. Therefore, if a picture is to include the photographer, there are various limitations in taking the picture.

SUMMARY

Embodiments include a digital photographing device for controlling a photographing function remotely without using a remote control through a face detection function.

According to an embodiment, a digital photographing device includes an input unit that receives face information, an image generating unit that generates an image having at least one face, a face detecting unit that detects faces from the image, a determination unit that determines whether the detected faces correspond to the received face information, and an output signal generating unit that generates an output signal when the detected faces correspond to the received face information based on a determination result of the determination unit.

The digital photographing device may further include a first display unit and a second display unit. The first display unit may be on a side of the digital photographing device having a lens, and the second display unit may be on another side of the digital photographing device. The image with the at least one face generated by the image generating unit may be displayed on the first display unit.

The face information may include the number of desired faces. The input unit may receive the number of desired faces from a user, and the determination unit may determine whether the number of detected faces corresponds to the number of desired faces.

The face information may include a registered face. The input unit may receive the registered face selected by a user, the registered face being stored in a database of the digital photographing device, and the determination unit may determine whether any of the detected faces corresponds to the selected registered face.

The face information may include a desired face position. The input unit may receive the desired face position from a user, and the determination unit may determine whether any of the detected faces is placed on the received desired face position.

The digital photographing device may include a first display unit and a second display unit. The first display unit may be on a side of the digital photographing device having a lens and the second display unit may be on another side of the digital photographing device. The image with the at least one face generated by the image generating unit may be on the first display unit, and when the image with the at least one face is displayed on the first display unit, the desired face position received from the user through the input unit may be displayed on the first display unit.

The output signal generating unit may generate an image signal corresponding to an image according to the determination result of the determination unit, and the image corresponding to the image signal generated from the output signal generating unit may be displayed on the first display unit.

The image signal may correspond to a countdown.

The image generating unit may generate a live view image having the at least one face. The face detecting unit may detect the at least one face from the live view image, and when the image signal is outputted completely on the first display unit, the image generating unit may generate a captured image having the at least one face.

Another embodiment includes a method of controlling a digital photographing device. The method includes: receiving face information, generating an image having at least one face, detecting the faces from the image, determining whether the detected faces correspond to the received face information, and generating an output signal when the detected faces correspond to the received face information based on a determination result.

The digital photographing device may include a first display unit and a second display unit. The first display unit may be on a side of the digital photographing apparatus having a lens, and the second display unit may be on another side of the digital photographing device. The image with the at least one face may be displayed on the first display unit.

The face information may include a number of desired faces. The receiving of the face information may include receiving the number of desired faces, and the determining of whether the detected faces correspond to the received face information may include determining whether a number of detected faces corresponds to the number of faces.

The face information may include a registered face. The receiving of the face information may include selecting the registered face, the registered face being stored in a database of the digital photographing device, and the determining of whether the detected faces correspond to the received face information may include determining whether any of the detected faces corresponds to the selected registered face.

The face information may include a desired face position. The receiving of the face information may include receiving the desired face position, and the determining of whether the detected faces correspond to the inputted face information may include determining whether any of the detected faces is on the inputted face position.

The digital photographing device may include a first display unit and a second display unit. The first display unit may be on a side of the digital photographing device having a lens, and the second display unit may be on another side of the digital photographing device. The image having the at least one face generated by an image generating unit may be displayed on the first display unit, and when the image having the at least one face is displayed on the first display unit, the face position received through an input unit is displayed on the first display unit.

The generating of the output signal may include driving an image signal corresponding to an image according to the determination result, and the image corresponding to the image signal may be displayed on the first display unit.

The image signal may correspond to a countdown.

The generating of the image may include generating a live view image having the at least one face. The detecting of the faces may include detecting the faces from the live view image. When the image signal is outputted completely on the first display unit, the method may further include generating a captured image having the at least one face and displaying the captured image on the first display unit.

BRIEF DESCRIPTION OF THE DRAWINGS

The above and other features and advantages will become more apparent by describing in detail exemplary embodiments with reference to the attached drawings in which:

FIG. 3 is a flowchart of a method of controlling a digital photographing device according to an embodiment;

FIG. 5 is a flowchart of a method of controlling a digital photographing device according to another embodiment;

FIG. 7 is a flowchart of a method of controlling a digital photographing device according to another embodiment.

DETAILED DESCRIPTION

Figure 1A:
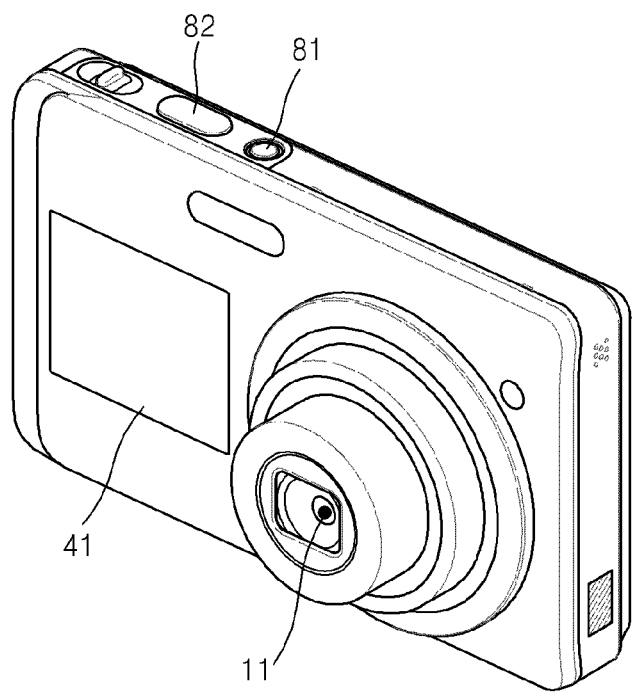
FIG. 1A is a front, perspective view of a digital photographing device according to an embodiment.

Hereinafter, the invention will be described in detail by explaining embodiments of the invention with reference to the attached drawings. However, this does not limit the invention within specific embodiments and it should be understood that the invention covers all the modifications, equivalents, and replacements within the idea and technical scope of the invention. Moreover, detailed descriptions related to well-known functions or configurations will be undisclosed in order not to unnecessarily obscure subject matters of the invention.

It will be understood that although the terms first and second are used herein to describe various elements, these elements should not be limited by these terms. Terms are only used to distinguish one component from other components.

In the following description, the technical terms are used only for explaining a specific exemplary embodiment and are not meant to be limiting. The terms of a singular form may include plural forms unless referred to the contrary. Also, the use of the terms "a" and "an" and "the" and similar referents in the context of describing the invention (especially in the context of the following claims) are to be construed to cover both the singular and the plural, unless the context clearly indicates otherwise. The meaning of 'comprises' and/or 'comprising' specifies a property, a region, a fixed number, a step, a process, an element, and/or a component but does not exclude other properties, regions, fixed numbers, steps, processes, elements, and/or components. It will be recognized that the terms "comprises," "comprising," "includes," "including," "has," and "having," as used herein, are specifically intended to be read as open-ended terms of art. No item or component is essential to the practice of the invention unless the element is specifically described as "essential" or "critical".

The invention may be represented with functional block configurations and various processing steps. These functional blocks may be realized with a different number of hardware or/and software components for executing specific functions. For example, the invention may adopt integrated circuit components such a memory, processing, logic, and a look-up table, which may execute various functions by control of at least one microprocessor or other control devices. As some components may be executed by software programming or software components, the invention may be realized by programming languages such as C, C++, Java, and assembler or scripting languages, with diverse algorithms realized with data structures, processors, routines, or other programming components. Functional aspects may be realized with an algorithm executed by at least one processor. In addition, the invention may adopt a typical technique for electronic environmental setting, signal processing, and/or data processing.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Terms such as mechanism, components, means, and configuration may be broadly used and are not limited to mechanical and physical components. The terms may mean a series of routines of software in connection to a processor.

Hereinafter, embodiments are described in more detail with reference to the accompanying drawings and, while describing the accompanying drawings, like reference numerals in the drawings denote like elements. Therefore, overlapping descriptions thereof will be omitted.

Figure 1B:
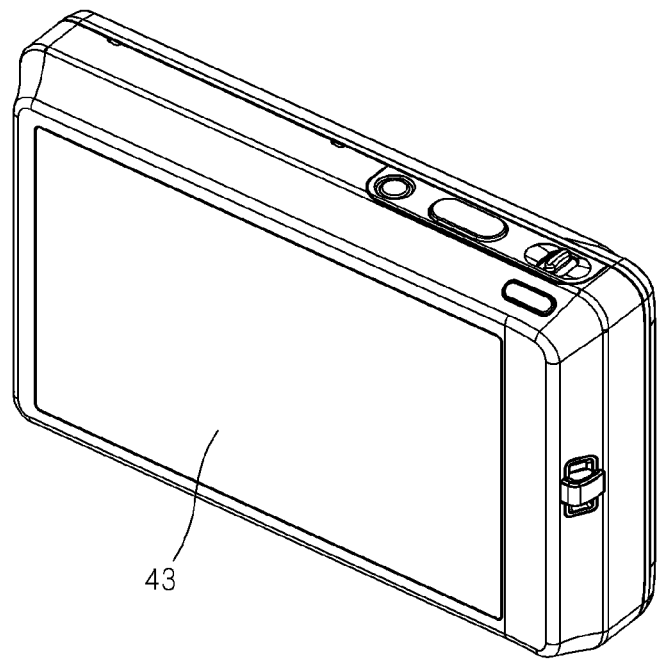
FIG. 1B is a rear, perspective view of a digital photographing device according to an embodiment.

FIG. 1A is a front perspective view of a digital photographing device according to an embodiment. FIG. 1B is a rear perspective view of a digital photographing device according to an embodiment. In the embodiments shown, the digital photographing device can be applied to a compact digital camera, but embodiments are not limited thereto. The digital photographing device may be applied to a digital device such as a video camera, a personal digital assistant (PDA), a TV, a digital album, a mobile phone, or a portable multimedia player (PMP).

Referring to FIG. 1A, a first display unit 41 can be disposed on a front of the digital photographing device. A portion of an optical unit 11 can protrude from the front of the digital photographing device. For example, a lens of the optical unit 11 can protrude from the front of the digital photographing device. The first display unit 41 can be disposed on the front so as to face a subject. The subject may be shown as an image on the first display unit 41. A power button 81 and a shutter release button 82 can be disposed on a top of the digital photographing device.

Referring to FIG. 1B, the digital photographing device can further include a second display unit 43. The second display unit 43 can be disposed on the rear to face a photographer. The photographer may be shown as an image on the second display unit 43.

The digital photographing device is described in more detail with reference to a block diagram of FIG. 2.

Figure 2:
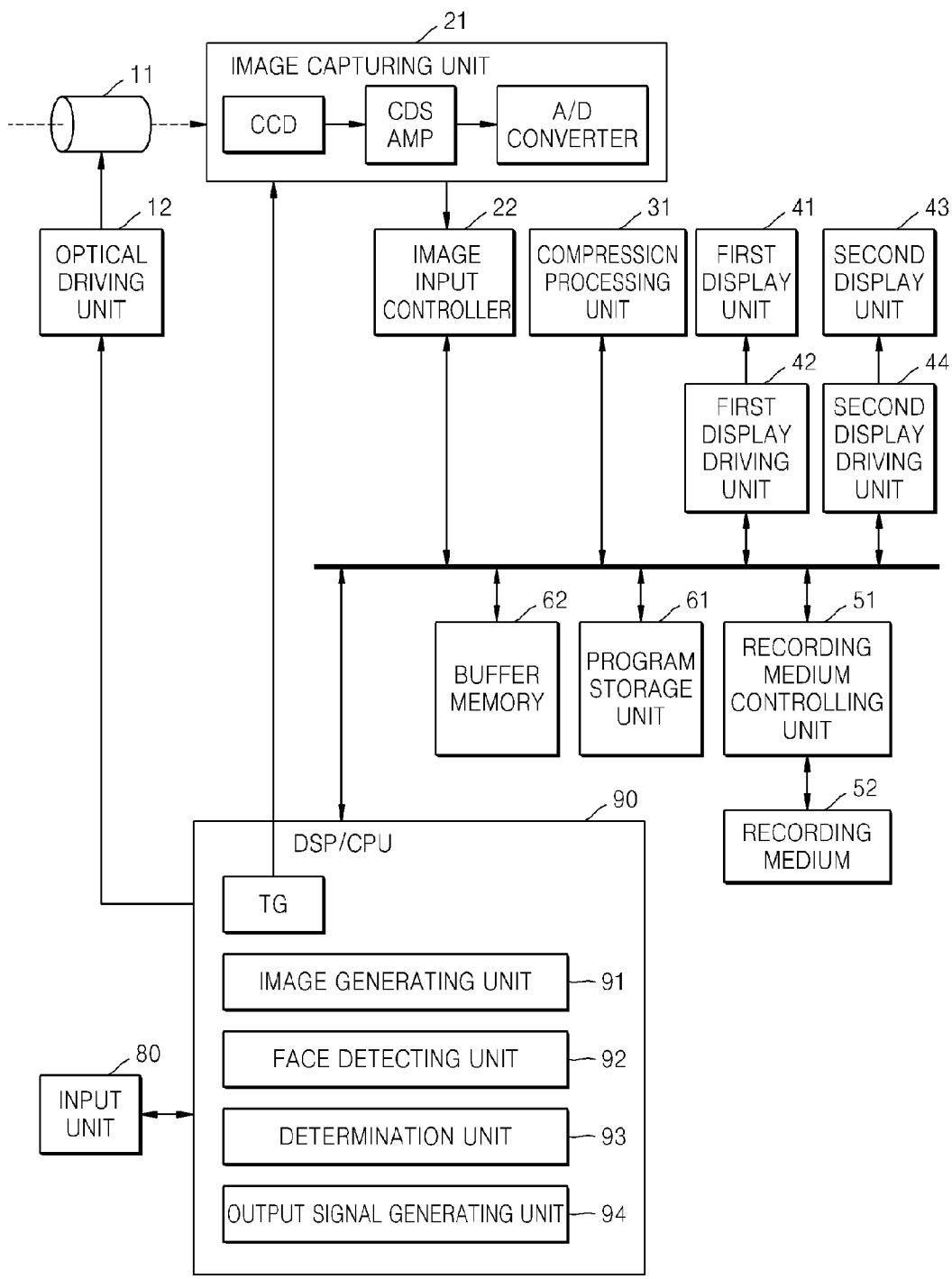
FIG. 2 is a block diagram of a digital photographing device according to an embodiment.

Referring to FIG. 2, the digital photographing device can include an optical unit 11, an optical driving unit 12 for driving the optical unit 11, an image capturing unit 21, an image input controller 22, a compression processing unit 31, the first display unit 41 on the front of the digital photographing device, a first display driving unit 42, the second display unit 43 on the rear of the digital photographing device, a second display driving unit 44, a recording medium controlling unit 51, a recording medium 52, a program storage unit 61, a buffer memory 62, an input unit 80, and a digital signal processor (DSP)/central processing unit (CPU) 90.

The optical unit 11 may include a lens that collects an optical signal, an aperture that adjusts an amount of the optical signal (i.e., a quantity of light), and a shutter that controls an input of the optical signal. The lens can include a zoom lens and a focus lens. The zoom lens can control a viewing angle to be narrow or wide according to a focal length. The focus lens can focus on a subject. Each of the lenses may be configured as a single lens or as a plurality of lenses. The shutter may be a mechanical shutter, such as a screen that may move vertically. In addition, instead of the shutter or a shutter device, controlling supply of an electrical signal to operate the image capturing unit 21 may serve as the shutter or the shutter device.

The optical driving unit 12 that drives the optical unit 11 may drive the lenses, the aperture, and the shutter in order to perform operations such as auto focus, automatic exposure adjustment, aperture adjustment, zoom adjustment, and focus change. The optical driving unit 12 may receive a control signal from the DSP/CPU 90 and then can drive the optical unit 11 in response to the control signal.

The image capturing unit 21 can include a charge coupled device (CCD) as a photovoltaic device that collects optical signals inputted through the optical unit 11 and that converts the collected optical signals into electrical signals. In this embodiment, a CCD sensor array can be an example of the image capturing device 21, but embodiments are not limited thereto. For example, a complementary metal oxide semiconductor (CMOS) sensor array may be used as the image capturing device 21.

In addition, the image capturing unit 21 can include a correlated double sampling (CDS)/amplifier (AMP), and an A/D converter. The CDS/AMP can remove low frequencies from the electrical signals outputted from the CCD and can amplify the electrical signals to a predetermined level at the same time. The A/D converter can convert the electrical signals outputted from the CDS/AMP into digital signals. Then, the A/D converter can output the digital signals into the image input controller 22.

The image capturing unit 21 may be controlled in response to a timing signal supplied from the DSP/CPU 90. A timing generator (TG) of the DSP/CPU 90 can output a timing signal to the image capturing unit 21 to control an exposure period of each of the pixels constituting the CCD or to read electric charges. Accordingly, the image capturing unit 21 may provide image data corresponding to one image frame in response to the timing signal provided from the TG.

The compression processing unit 31 can receive an image signal and can compress the image signal into a compression format, such as a Joint Photographic Experts Group (JPEG) compression format or a Lempel-Ziv-Welch (LZW) compression format. The compression processing unit 31 can transmit the compression-processed image data to the recording medium 52, and then the recording medium 52 can store the transmitted image data.

The first display driving unit 42 can be driven to display on the first display unit 41 various setting screens or an image corresponding to image data generated through image capturing. The second display driving unit 44 can be driven to display on the second display unit 43 various setting screens or an image corresponding to image data generated through image capturing. The image data may be from an image recorded in the recording medium 52 or may be provided from the buffer memory 62 in real-time. Display devices such as liquid crystal display (LCD) devices, organic light emitting diode (OLED) devices, plasma display panel (PDP) devices, or electrophoresis display (EDD) devices may be used as the first display unit 41 or the second display unit 43.

The first display unit 41 can be embedded in the front of the digital photographing device. The second display unit 43 can be embedded in the rear of the digital photographing device. According to an embodiment, since the first display unit 41 is disposed on the front to face a subject, a live view image of the subject may be displayed on the first display unit 41. Accordingly, an image including the subject may be composed using the live view image. Moreover, when photographing with a timer, a countdown corresponding to time remaining on the timer may be displayed on the first display unit 41. Accordingly, a photographer may be able to recognize the time remaining before image capturing is performed. These operations of the first display unit 41 and the DSP/CPU 90 is described in more detail below.

The recording medium controlling unit 51 can control writing of image data into the recording medium 52 or reading of image data (or setting information) from the recording medium 52. The recording medium 52 can record captured image data and may include an optical disk (such as a CD, a DVD, or a Blu-ray disk), an optical magnetic disk, a magnetic disk, or a semiconductor memory medium. The recording medium controlling unit 51 and the recording medium 52 may be detachable from the digital photographing device.

The program storage unit 61 may store an operating system (OS) application program necessary for operating the digital photographing device. An EEPROM, a flash memory, or a ROM may be used as the program storage unit 61.

The buffer memory 62 may temporarily store image data of a captured image. Image data of a plurality of images may be recorded, and image signals can be continuously maintained during focus control and then are outputted if necessary. Reading and writing of image data from and in the image input controller 22 may be controlled. In addition, the buffer memory 62 may include memory for different channels used to display an image. Image data for an image may be inputted into the buffer memory 62, and image data for displaying an image may be outputted to the first display driving unit 42 and the second display driving unit 44, simultaneously.

The input unit 80 may include means for manipulating the digital photographing device or performing various kinds of settings during photographing. For example, the input unit 80 may include a button, a key, a touch panel, a touch screen, a dial, combinations of the aforementioned, or some other input device so that a manipulation signal may be inputted by a photographer to perform, for example, power on/off, camera start/stop, play start/stop, search, the driving of an optical system, a mode switch, menu manipulation, and selection manipulation. According to an embodiment, the input unit 80 may receive face information from a user. For example, a user may input face information such as the number of faces, the selected face of a plurality of faces registered or stored in a database, or the selected specific point of a display unit 41 or 43 or an input unit 80 as a face position.

The DSP/CPU 90 can control operations of other components installed in the digital photographing device. The DSP/CPU 90 can be an operation processing device or a control device driven by program. For example, when the DSP/CPU 90 outputs a control signal to the optical driving unit 12, the optical driving unit 12 can drive the optical unit 11 based on a focus control or an exposure control. Moreover, the DSP/CPU 90 can control each component of the digital photographing device based on signals inputted from the input unit 80. In the embodiment shown, the DSP/CPU 90 is just one CPU, but several CPUs for respectively executing commands of a signal system and commands of a manipulation system may be used.

Moreover, the DSP/CPU 90 can include an image generating unit 91 that generates a live view image having a subject (especially, a face) and a face detecting unit 92 that detects a face from the image. The DSP/CPU 90 may include a determination unit 93 that determines whether the detected face corresponds to face information inputted from the input unit 80. The DSP/CPU 90 may further include an output signal driving unit 94. If the detected face corresponds to the face information based on a determination performed by the determination unit 93, the output signal driving unit 94 can generate an output signal. The output signal may be outputted as an image signal through the first display unit 41. If the output signal is outputted completely, the image generating unit 91 may generate a captured image having a face.

The image generating unit 91 can generate a live view image having a subject (especially, at least one face) or a captured image having at least one face. The image generating unit 91 can reduce noise with respect to inputted image data and can perform image signal processing, such as color filter array interpolation, color matrix, color correction, and color enhancement. The image signal processing can be performed on image data inputted by capturing an image of a subject in such a way that a captured image having the subject may be generated.

According to an embodiment, if the subject is a face, the image generating unit 91 can generate a live view image having the face, and the face detecting unit 92 can detect the face from the image through a face detecting algorithm. The face detecting unit 92 can detect the face from the image during a live view mode. The face detecting algorithm can include a technique that detects a face based on face features, such as skin color, position and shape of a nose, or position and shape of a mouth, or a technique that detects a face according to a template with a face pattern.

The determination unit 93 can compare the face detected by the face detecting unit 92 with the face information inputted through the input unit 80 and then can determine whether the detected face corresponds to the face information. The face information may be presented or provided in various ways, and detailed descriptions thereof are made with reference to FIGS. 3 through 8.

The output signal driving unit 94 can generate an output signal when the detected face corresponds to the inputted face information based on a determination result of the determination unit 93. The output signal may be an image signal corresponding to an image or an image signal corresponding to a countdown, which may be displayed on the first display unit 41. Accordingly, a photographer as a subject may predict when image capturing is to be performed by viewing the first display unit 41. Once the generating of the output signal is completed, the TG of the DSP/CPU 90 can supply a timing signal to the image capturing unit 21 in order to capture an image. As a result, the image generating unit 91 can generate a captured image.

FIG. 3 is a flowchart illustrating a method of controlling a digital photographing device according to an embodiment.

FIGS. 4A to 4D are diagrams illustrating the method of controlling a digital photographing device of FIG. 3.

Figure 4A:
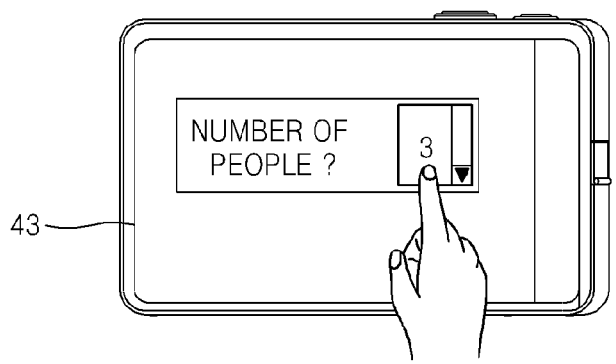
FIGS. 4A to 4D are diagrams illustrating the method of controlling a digital photographing device of FIG. 3.

Referring to FIG. 3, a timer mode using face detection can start in operation S301, and a user can input face information and can set a timer time in operation S302. The face information may include the number of faces. In other words, if the subject is a group of people, the face information may be the number of people. The timer time may be arbitrarily set by a user. The timer may be set with a default value, such as 10 sec or 2 sec. As shown in FIG. 4A, the face information may be inputted through the second display 43 functioning as the input unit 80, e.g., a touch screen, or through a separate input unit 80. A user may input as the face information that the number of faces is, for example, 3 (that is, if a subject is a group of people, the number of people to be captured is 3) through the second display unit 43 functioning as the input unit 80, e.g., a touch screen. For an embodiment where the face information includes the number of faces, the above operation is described in more detail below.

A live view image can be generated in operation S303. The live view image may be displayed on the first display unit 41 disposed on the front of the digital photographing device so that the first display unit 41 faces the subject. Embodiment are not limited thereto, and thus the live view image may also be displayed simultaneously on the second display unit 43 embedded in the rear of the digital photographing device.

Figure 4B:
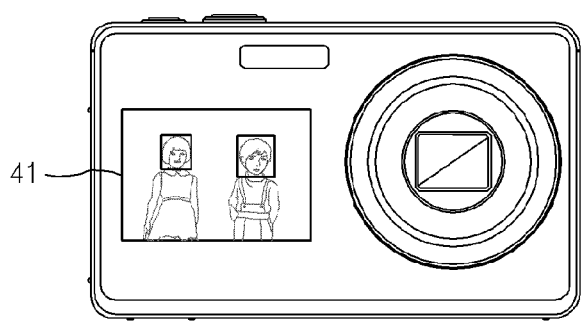

In operation S304, faces can be detected from the live view image. The faces may be detected through a face detection algorithm. As shown in FIG. 4B, in order to confirm whether a face of a subject is detected from the live view image, a box may be indicated on a region corresponding to a face for each face in the live view image displayed on the first display unit 41.

Figure 4C:
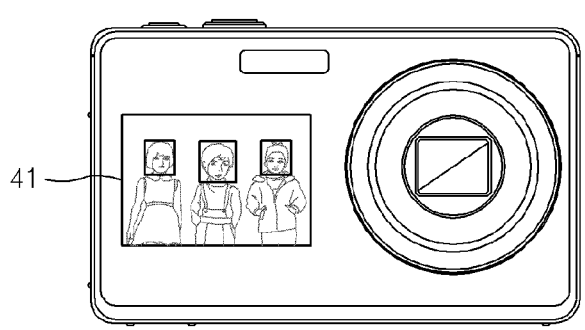

In operation S305, it can be determined whether the number of detected faces corresponds to the inputted face information. For example, when there are two subjects as shown in FIG. 4B, two faces can be detected, but the detected two faces do not correspond to the inputted face information, or 3 in this example. Face detection can be continuously performed on the live view image. When there are three subjects as shown in FIG. 4C, three faces can be detected, and the detected three faces correspond to the inputted face information, or 3 in this example.

Figure 4D:
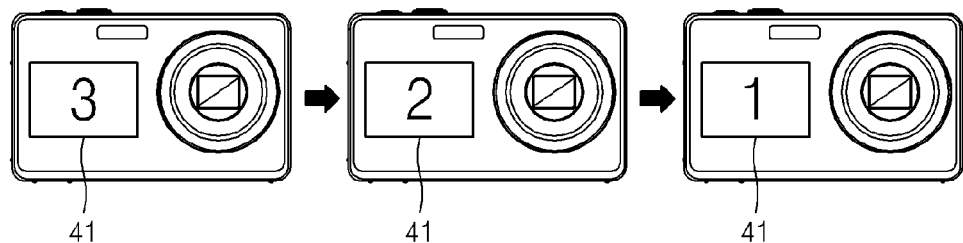

In operation S306, if the detected faces correspond to the inputted face information, an output signal can be generated. The output signal can be an image signal corresponding to an image and the first display unit 41 as an output unit may display the image. As shown in FIG. 4D, the image signal may correspond to a countdown to display the set timer time. By displaying the countdown on the first display unit 41 according to the set timer time, a subject may confirm the time remaining before image capturing is completed.

If an output signal is outputted completely or the countdown of the set timer time is completed, an image having a desired subject can be captured to generate a captured image in operation S307. Accordingly, an image including a predetermined number of faces can be obtained.

In general, when a photographer wants to be included in a picture, after setting the timer time and manipulating the digital photographing device, the photographer needs to be within a predetermined place within a predetermined amount of time in order to be a subject of the picture. It can be very hard to achieve a desirable image since the timer time may be insufficient depending on the agility of the photographer or because the image may be captured before the composition of the picture has been adjusted. However, according to the embodiments of the FIGS. 3 and 4A to 4D, when the number of faces is set, capturing an image may not be performed until the photographer can be included as a subject (as determined by a face detection function). Moreover, when the set number of faces, including the face of the photographer, corresponds to the number of detected faces, there may be enough time to arrange the composition of the picture composition due to setting of the timer time. Thus, the photographer can obtain a desirable picture. Moreover, according to this embodiment, a face detection function without using a remote control may serve to remotely control the digital photographing device.

FIG. 5 is a flowchart illustrating a method of controlling a digital photographing device according to another embodiment. FIGS. 6A to 6D are diagrams illustrating the method of controlling a digital photographing device of FIG. 5.

Figure 6A:
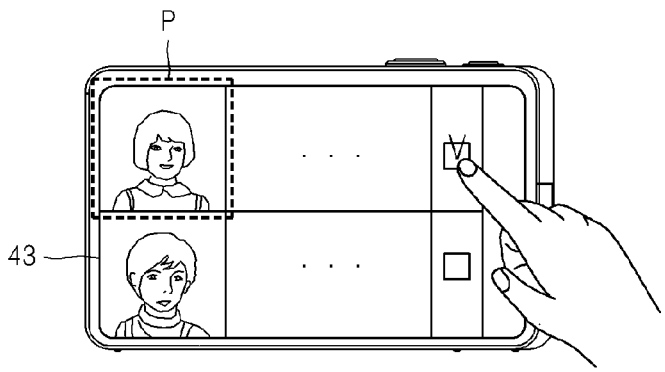
FIGS. 6A to 6D are diagrams illustrating the method of controlling a digital photographing device of FIG. 5.

Referring to FIG. 5, a timer mode using face detection can start in operation S501, and a user can input face information and can set a timer time in operation S502. The face information may include a registered face. In other words, at least one face may be selected from registered faces stored in a database of the recording medium 52. As shown in FIG. 6A, the face information may be inputted through the second display 43 functioning as the input unit 80, e.g., a touch screen, or through a separate input unit 80. A user can open a registered face list and can select at least one registered face through the second display unit 43 functioning as the input unit 80, e.g. a touch screen. For example, in the embodiment shown, a face P may be selected. The registering of a face in the database can include focusing on a face to be registered through a face detection technique in a photographing mode and capturing and storing an image with the focused face. Face information corresponding to the registered face may be stored simultaneously.

A live view image can be generated in operation S503. The live view image may be displayed on the first display unit 41 disposed on the front of the digital photographing device so that the first display unit 41 faces the subject.

Figure 6B:
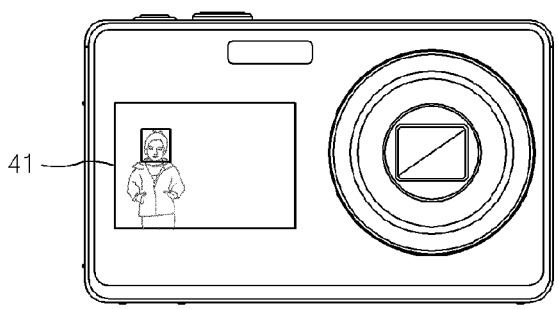

Faces can be detected from a live view image in operation S504. The faces may be detected through a face detection algorithm. As shown in FIG. 6B, in order to confirm whether a face is detected from the live view image, a box may be indicated on a region corresponding to a face for each face in the live view image displayed on the first display unit 41.

Figure 6C:
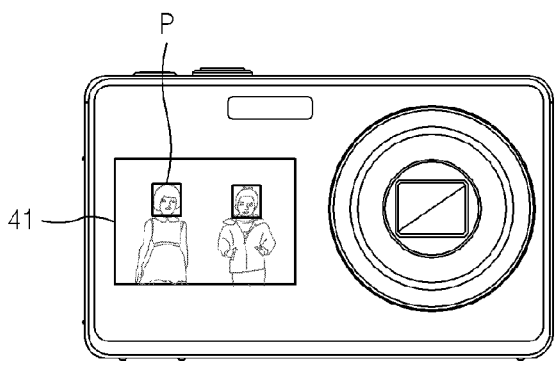

In operation S505, it can be determined whether the detected faces correspond to the inputted face information. For example, if the detected subject faces are different from the registered face P as shown in FIG. 6B, the detected faces would not correspond to the inputted face information. Face detection can be continuously performed through the live view image. However, if there is a subject having the registered face P as shown in FIG. 6C, the detected face can correspond to the inputted face information. When a face corresponding to the registered face P is detected, a box including an indication, an insignia, or a symbol, such as *, may be displayed on a corresponding face region (the indication, the insignia, or the symbol, such as *, is not shown in the diagram). Accordingly, it can be confirmed that the registered face P is detected from the live view image.

Figure 6D:
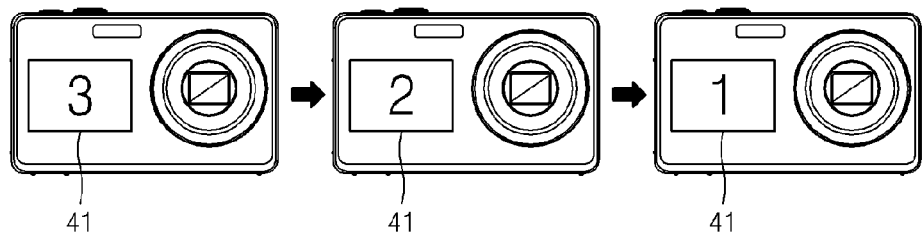

If the detected face corresponds to the inputted face information, an output signal can be generated in operation S506. The output signal can be an image signal corresponding to an image, and the first display unit 41 as an output unit may display the image. As shown in FIG. 6D, the image signal may correspond to a countdown to display the set timer time.

When an output signal is outputted completely, an image having a desired subject can be captured, and the captured image can be generated in operation S507. Accordingly, an image having a desired face can be obtained.

According to the embodiment of the FIGS. 5 and 6A to 6D, when the face of a photographer is registered in advance as a registered face through a face detection function and then is selected as a registered face, image capturing may not be performed until the photographer can be included as a subject. Moreover, even if the photographer is included as a subject and the registered face corresponds to a detected face, there can be enough time for adjusting a composition of the picture due to the setting of the timer time, and thus a desirable picture can be obtained.

FIG. 7 is a flowchart illustrating a method of controlling a digital photographing device according to another embodiment. FIGS. 8A to 8D are diagrams illustrating the method of controlling a digital photographing device of FIG. 7.

Figure 8A:
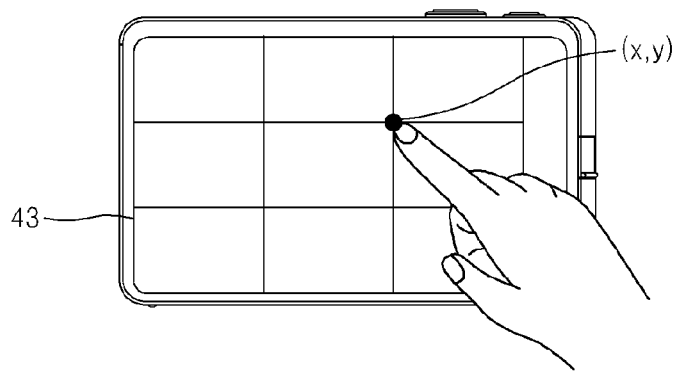
FIGS. 8A to 8D are diagrams illustrating the method of controlling the digital photographing device of FIG. 7.

Referring to FIG. 7, a timer mode using face detection can start in operation S701, and a user can input face information and can set a timer time in operation S702. The face information may include a face position. In other words, a position where a face is to be placed may be displayed on the first display unit 41 or the second display unit 43. As shown in FIG. 8A, face information may be inputted through the second display 43 functioning as the input unit 80, e.g., a touch screen, or through a separate input unit 80. A face position is inputted through the second display unit 43 functioning as a touch screen, and thus coordinate information of a corresponding position may be inputted. For example, the face position can be placed on a top right corner of a nine section grid when a screen is trisected horizontally and vertically, as shown in the FIG. 8A. By displaying the nine section grid as auxiliary lines, the lines can help a photographer to easily recognize a face position. For example, in the embodiment shown, the coordinate information in which a face is to be positioned can be (x, y). Although the face information is inputted through the second display unit 43 as shown in FIG. 8A, embodiments are not limited thereto, and the face information may be inputted through the first display unit 41 functioning as a touch screen or a separate input unit 80.

Figure 8B:
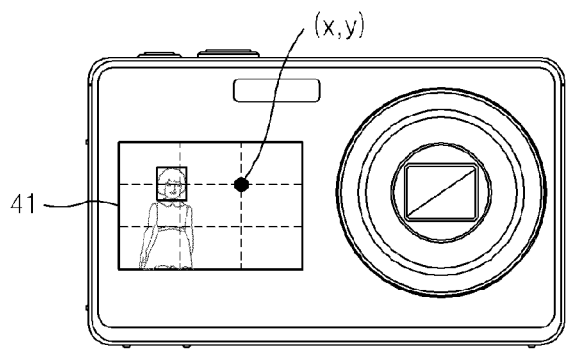

A live view image can be generated in operation S703. The live view image may be displayed on the first display unit 41 disposed on the front of the digital photographing device so that the first display unit 41 faces the subject. Referring to FIG. 8B, when the live view image is displayed on the first display unit 41, the inputted face information, that is, a face position, may also be displayed on the first display unit 41. In addition to the inputted face information, the nine-section grid on the second display unit 43 may also be displayed as auxiliary lines on the first display unit 41. Accordingly, a subject may confirm whether a subject face is disposed on the inputted face position, and thus the picture composition can be adjusted.

Faces can be detected from the live view image in operation S704. The faces may be detected through a face detection algorithm. As shown in FIG. 8B, in order to confirm whether a face is detected from the live view image, a box may be indicated on a region corresponding to a face for each face in the live view image displayed on the first display unit 41.

Figure 8C:
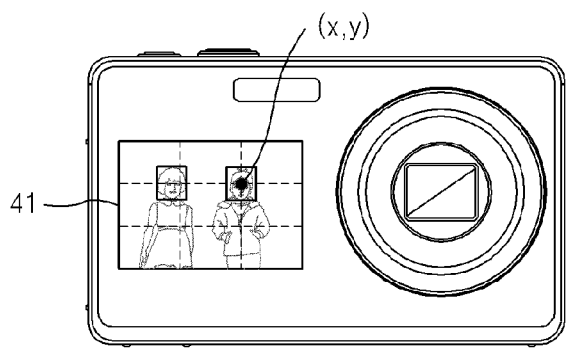

It can be determined whether positions of the detected faces correspond to the inputted face position in operation S705. For example, if a subject face is not disposed on the inputted face position (x, y) as shown in FIG. 8B, the positions of detected faces would not correspond to the inputted face information. Face detection can be continuously performed on the live view image. However, if a subject face is disposed on the inputted face position (x, y) as shown in FIG. 8C, the position of the detected face can correspond to the inputted face information.

Figure 8D:
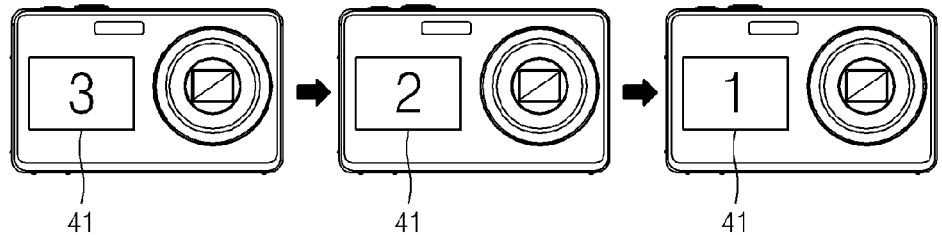

When the detected face position corresponds to the inputted face information, an output signal can be generated in operation S706. The output signal can be an image signal corresponding to an image, and the first display unit 41 as an output unit may display the image. As shown in FIG. 8D, the image signal may correspond to a countdown to display the set timer time.

Once the output signal is outputted completely, an image having a desired subject can be captured, and the captured image can be generated in operation S707. Accordingly, an image with a subject face on a desired position can be obtained.

According to the embodiments of FIGS. 7 and 8A to 8D, through a face detection function, a position where a subject face is to be placed can be inputted in advance, and image capturing can be performed when a subject face is placed on the corresponding face position. Accordingly, when a photographer wants to be the subject in a picture, the photographer may move to the subject position after manipulating the digital photographing device. Then, the photographer may take a picture by placing their face on the corresponding position after taking a look at their face position on the first display unit 141. Moreover, the taking of a picture may be possible at a long distance without using a remote control. Also, the composition of the picture that the photographer wants may be adjusted by determining a desirable face position before taking a picture.

According to various embodiments, the digital photographing device can control a photographing function at a long distance through a face detection function and can provide convenience to a photographer when the photographer wants to be a subject in a picture. Thus, a desired picture can be obtained.

The digital photographing device can include display units at the front and the rear (that is, a dual display unit) so that a subject can easily recognize a capturing composition and visually confirm a face detection function.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

Moreover, embodiments can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the invention can be easily construed by programmers skilled in the art to which the invention pertains.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. This media can be read by the computer, stored in the memory, and executed by the processor.

The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those of ordinary skill in this art without departing from the spirit and scope of the invention as defined by the following claims. Therefore, the exemplary embodiments provided should be considered in a descriptive sense only and not for purposes of limitation. Thus, the scope of the invention is defined not by the detailed description of the invention but by the following claims, and all differences within the scope will be construed as being included in the invention.

What is claimed is:

1. A digital photographing device, comprising:
an input unit that receives face information;
an image generating unit that generates an image having at least one face;
a face detecting unit that detects faces from the image;
a determination unit that determines whether the detected faces correspond to the received face information;
an output signal generating unit that generates an output signal when the detected faces correspond to the received face information based on a determination result of the determination unit; and
a database that stores a plurality of faces,
wherein:
the face information includes a registered face;
the input unit receives the registered face selected according to an input command from the plurality of faces stored in the database; and
the determination unit determines whether any of the detected faces corresponds to the selected registered face.

2. The digital photographing device of claim 1, wherein:
the digital photographing device further comprises a first display unit and a second display unit;
the first display unit is disposed on a side of the digital photographing device having a lens and the second display unit is disposed on another side of the digital photographing device; and
the image with the at least one face generated by the image generating unit is displayed on the first display unit.

3. The digital photographing device of claim 2, wherein the output signal generating unit generates an image signal corresponding to an image according to the determination result of the determination unit and the image corresponding to the image signal generated from the output signal generating unit is displayed on the first display unit.

4. The digital photographing device of claim 3, wherein the image signal corresponds to a countdown.

5. The digital photographing device of claim 3, wherein:
the image generating unit generates a live view image having the at least one face;
the face detecting unit detects the at least one face from the live view image; and when the image signal is outputted completely on the first display unit, the image generating unit generates a captured image having the at least one face.

6. The digital photographing device of claim 1, wherein:
the output signal is a timer countdown signal; and
the output signal generating unit generates the timer countdown signal when one of the detected faces corresponds to the selected registered face.

7. A digital photographing device, comprising:
an input unit that receives face information;
an image generating unit that generates an image having at least one face;
a face detecting unit that detects faces from the image;
a determination unit that determines whether the detected faces correspond to the received face information; and
an output signal generating unit that generates an output signal when the detected faces correspond to the received face information based on a determination result of the determination unit,
wherein:
the face information includes a desired face position;
the input unit receives the desired face position according to an input command; and
the determination unit determines whether any of the detected faces is placed on the received desired face position.

8. The digital photographing device of claim 7, wherein:
the digital photographing device comprises a first display unit and a second display unit;
the first display unit is disposed on a side of the digital photographing device having a lens and the second display unit is disposed on another side of the digital photographing device;
the image with the at least one face generated by the image generating unit is disposed on the first display unit; and
when the image with the at least one face is displayed on the first display unit, the desired face position received through the input unit is displayed on the first display unit.

9. The digital photographing device of claim 7, wherein:
the output signal is a timer countdown signal; and
the output signal generating unit generates the timer countdown signal when one of the detected faces is disposed on the received desired face position.

10. A method of controlling a digital photographing device, the method comprising:
storing a plurality of faces in a database of the digital photographing device;
receiving face information;
generating an image having at least one face;
detecting the faces from the image;
determining whether the detected faces correspond to the received face information; and
generating an output signal when the detected faces correspond to the received face information based on a determination result,
wherein:
the face information includes a registered face;
the receiving of the face information includes selecting the registered face from the plurality of faces stored in the database; and
the determining of whether the detected faces correspond to the received face information includes determining whether any of the detected faces corresponds to the selected registered face.

11. The method of claim 10, wherein:
the digital photographing device comprises a first display unit and a second display unit;
the first display unit is disposed on a side of the digital photographing apparatus having a lens and the second display unit is disposed on another side of the digital photographing device; and
the image with the at least one face is displayed on the first display unit.

12. The method of claim 11, wherein the generating of the output signal includes driving an image signal corresponding to an image according to the determination result and the image corresponding to the image signal is displayed on the first display unit.

13. The method of claim 12, wherein the image signal corresponds to a countdown.

14. The method of claim 12, wherein:
the generating of the image includes generating a live view image having the at least one face;
the detecting of the faces includes detecting the faces from the live view image; and
when the image signal is outputted completely on the first display unit, generating a captured image having the at least one face and displaying the captured image on the first display unit.

15. The method of claim 10, wherein:
the output signal is a time countdown signal; and
the generating of the output signal comprises generating the timer countdown signal when one of the detected faces corresponds to the selected registered face.

16. A method of controlling a digital photographing device, the method comprising:
receiving face information;
generating an image having at least one face;
detecting the faces from the image;
determining whether the detected faces correspond to the received face information; and
generating an output signal when the detected faces correspond to the received face information based on a determination result,
wherein:
the face information includes a desired face position;
the receiving of the face information includes receiving the desired face position; and
the determining of whether the detected faces correspond to the inputted face information includes determining whether any of the detected faces is disposed on the inputted face position.

17. The method of claim 16, wherein:
the digital photographing device comprises a first display unit and a second display unit;
the first display unit is disposed on a side of the digital photographing device having a lens and the second display unit is disposed on another side of the digital photographing device;
the image having the at least one face generated by an image generating unit is displayed on the first display unit; and
when the image having the at least one face is displayed on the first display unit, the face position received through an input unit is displayed on the first display unit.

18. The method of claim 16, wherein:
the output signal is a timer countdown signal; and
the generating of the output signal comprises generating the timer countdown signal when one of the detected faces is disposed on the inputted face position.

* * * * *